(12) United States Patent
Kashani

(10) Patent No.: US 10,065,472 B2
(45) Date of Patent: Sep. 4, 2018

(54) DUAL BEARING STRUT ASSEMBLIES AND VEHICLE SUSPENSION SYSTEMS WITH DUAL BEARING STRUT ASSEMBLIES

(71) Applicant: Toyota Motor Engineering & Manufacturing North America, Inc., Erlanger, KY (US)

(72) Inventor: Aria Kashani, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/412,974

(22) Filed: Jan. 23, 2017

(65) Prior Publication Data

US 2018/0194187 A1 Jul. 12, 2018

Related U.S. Application Data

(60) Provisional application No. 62/444,592, filed on Jan. 10, 2017.

(51) Int. Cl.
*B60G 15/06* (2006.01)
*B60G 3/18* (2006.01)

(52) U.S. Cl.
CPC ............. *B60G 15/068* (2013.01); *B60G 3/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,245,826 A | * | 1/1981 | Wirges | A47C 3/30 188/300 |
| 4,462,608 A | * | 7/1984 | Lederman | B60G 15/068 267/220 |
| 4,721,325 A | * | 1/1988 | Mackovjak | B60G 13/006 267/33 |
| 4,828,237 A | | 5/1989 | Neff | |
| 5,308,104 A | * | 5/1994 | Charles | B60G 11/52 267/220 |
| 6,267,512 B1 | * | 7/2001 | Beghini | B60G 15/068 384/607 |
| 6,290,218 B1 | * | 9/2001 | Mayerbock | B60G 15/067 188/321.11 |

(Continued)

FOREIGN PATENT DOCUMENTS

| | | |
|---|---|---|
| DE | 102012220204 A1 | 5/2014 |
| KR | 101244248 B1 | 3/2013 |

*Primary Examiner* — Nicole T Verley
(74) *Attorney, Agent, or Firm* — Dinsmore & Shohl LLP

(57) ABSTRACT

A dual bearing strut assembly for a vehicle suspension system includes a strut with a shock absorber comprising a damper cylinder and a piston rod, and a coil spring disposed around the shock absorber. The damper cylinder may be affixed to a knuckle wheel assembly of a vehicle and the piston rod may be affixed to a top strut mount. An upper bearing assembly and a lower bearing assembly are included. The coil spring has an upper end seated to the upper bearing assembly and a lower end seated to the lower bearing assembly. The lower end of the coil spring freely rotates about the damper cylinder when the coil spring is compressed thereby reducing torque on the damper cylinder and reducing "bump steer" of the vehicle steering system.

20 Claims, 5 Drawing Sheets

(56) References Cited

U.S. PATENT DOCUMENTS

| | | | | |
|---|---|---|---|---|
| 6,923,461 B2* | 8/2005 | Momose | B60G 15/063 | 280/124.155 |
| 8,109,492 B2* | 2/2012 | Winocur | B60G 15/068 | 188/321.11 |
| 8,226,301 B2* | 7/2012 | Poulle | B60G 11/15 | 280/124.145 |
| 8,297,633 B2* | 10/2012 | Siebeneick | B60G 15/068 | 267/220 |
| 8,348,029 B2* | 1/2013 | Winocur | B60G 15/068 | 188/322.12 |
| 8,496,383 B2* | 7/2013 | Viault | B60G 15/068 | 267/217 |
| 8,696,004 B2 | 4/2014 | Baker et al. | | |
| 9,581,213 B2* | 2/2017 | Lee | F16F 1/127 | |
| 9,662,953 B2* | 5/2017 | Murakami | B60G 15/068 | |
| 9,770,107 B2* | 9/2017 | Glockl | A47C 9/002 | |
| 9,856,917 B1* | 1/2018 | Vidyasagar | F16C 33/7886 | |
| 9,869,351 B2* | 1/2018 | Wollner | F16C 35/06 | |
| 9,874,292 B2* | 1/2018 | Arnold | F16K 31/1268 | |
| 9,964,145 B2* | 5/2018 | Lepine | F16C 19/12 | |
| 2002/0003913 A1* | 1/2002 | Beghini | B60G 15/063 | 384/609 |
| 2007/0267793 A1* | 11/2007 | Chamousset | B60G 15/068 | 267/220 |
| 2010/0014792 A1* | 1/2010 | Kellam | B60G 15/067 | 384/196 |
| 2011/0187071 A1* | 8/2011 | Corbett | B60G 15/068 | 280/124.155 |
| 2011/0274384 A1* | 11/2011 | Montboeurf | B60G 15/068 | 384/607 |
| 2013/0313766 A1* | 11/2013 | Bussit | B60G 15/068 | 267/195 |
| 2014/0023307 A1* | 1/2014 | Stautner | F16C 33/583 | 384/615 |
| 2016/0089947 A1* | 3/2016 | Bedeau | F16C 27/08 | 248/634 |
| 2016/0146253 A1* | 5/2016 | Weiss, II | F16F 9/54 | 188/321.11 |
| 2016/0229253 A1* | 8/2016 | Seminara | B60G 11/15 | |

\* cited by examiner

DUAL BEARING STRUT ASSEMBLIES AND VEHICLE SUSPENSION SYSTEMS WITH DUAL BEARING STRUT ASSEMBLIES

TECHNICAL FIELD

The present specification generally relates to strut assemblies for vehicle suspension systems and, more specifically, to dual bearing strut assemblies for vehicle suspension systems.

BACKGROUND

A suspension system for a vehicle typically includes components such as shock absorbers, struts, stabilizer bars and the like. A strut typically includes a shock absorber with a coil spring disposed around the shock absorber and is affixed to and between a top mount assembly and a knuckle of a wheel assembly. The shock absorber and the coil spring are designed to dampen irregularities (e.g., bumps, pot holes, etc.) on a road surface the vehicle is traveling on. The coil spring is also designed to maintain the height of the vehicle and support weight that may be added to the vehicle. Upon compression of the strut, the coil spring compresses and attempts to rotate about a longitudinal axis of the shock absorber. However, current strut assemblies have at least one end of the coil spring in a fixed position, i.e., at least one end of the coil spring is not free to rotate about the shock absorber. The fixed position of the at least one end of the coil spring relative to the shock absorber may result in a torque on the shock absorber when the coil spring is compressed. Also, the torque may be transferred to the knuckle and result in a pull on the wheel assembly as the vehicle travels over road irregularities.

Accordingly, a need exists for alternative struts that reduce or eliminate torque resulting from coil spring compression.

SUMMARY

In one embodiment, a dual bearing strut assembly for a vehicle suspension system includes a strut with a damper cylinder, a piston rod and a coil spring. An upper bearing assembly and a lower bearing assembly are included and the coil spring extends between the upper bearing assembly and the lower bearing assembly. The coil spring has an upper end that is seated to the upper bearing assembly and a lower end seated to the lower bearing assembly such that the lower end of the coil spring rotates freely about the damper cylinder when the coil spring is compressed. In embodiments, the upper bearing assembly has an upper spring seat and the upper end of the coil spring is seated to the upper spring seat. In other embodiments, the lower bearing assembly has a lower spring seat and the lower end of the coil spring is seated to the lower spring seat. In some embodiments, the upper bearing assembly has an upper spring seat and the upper end of the coil spring is seated to the upper spring seat, and the lower bearing assembly has a lower spring seat and the lower end of the coil spring is seated to the lower spring seat. The upper bearing assembly may include a pair of bearing rings with a plurality of ball bearings disposed between the pair of bearing rings. In the alternative, or in addition to, the lower bearing assembly may include a pair of bearing rings with a plurality of ball bearings disposed between the pair of bearing rings.

In some embodiments, a vehicle suspension system with a top strut mount, a shock tower and a wheel knuckle are included. The vehicle suspension system has a dual bearing strut assembly affixed to and extending between the top strut mount and the wheel knuckle and the dual bearing strut assembly comprises a damper cylinder, a piston rod and a coil spring. The coil spring has an upper end and a lower end. The dual bearing strut assembly has an upper bearing assembly affixed to the shock tower and a lower bearing assembly affixed to the damper cylinder. The upper end of the coil spring is seated to the upper bearing assembly and the lower end of the coil spring is seated to the lower bearing assembly such that the lower end of the coil spring freely rotates about the damper cylinder when the coil spring is compressed. In embodiments, the piston rod has an upper end affixed to the top strut mount and the damper cylinder has a lower mount affixed to the wheel knuckle. The upper bearing assembly may include an upper spring seat and the upper end of the coil spring may be seated to the upper spring seat. Also, the lower bearing assembly may include a lower spring seat and the lower end of the coil spring may be seated to the lower spring seat. The upper bearing assembly may have a pair of bearing rings with a plurality of ball bearings disposed between the pair of bearing rings and the lower bearing assembly may have a pair of bearing rings with a plurality of ball bearings disposed between the pair of bearing rings.

In other embodiments, a front suspension system for a vehicle includes a driver-side top strut mount and a passenger-side top strut mount, a driver-side wheel knuckle and a passenger-side wheel knuckle, a driver-side dual bearing strut assembly affixed to and extending between the driver-side top strut mount and driver-side wheel knuckle, and a passenger-side dual bearing strut assembly affixed to and extending between the passenger-side top strut mount and passenger-side wheel knuckle. The driver-side dual bearing strut assembly and the passenger-side dual bearing strut assembly each comprise a damper cylinder, a piston rod, a coil spring, an upper bearing assembly and a lower bearing assembly. An upper end of the coil spring is seated to the upper bearing assembly and a lower end of the coil spring is seated to the lower bearing assembly. The lower end of the coil spring of the driver-side dual bearing strut assembly and the lower end of the coil spring of the passenger-side dual bearing strut assembly freely rotate about the damper cylinder of the driver-side dual bearing strut assembly and passenger-side dual bearing strut assembly, respectively, when the coil spring of the driver-side dual bearing strut assembly and the coil spring of the passenger-side dual bearing strut assembly, respectively, are compressed. The upper bearing assembly of the driver-side dual bearing strut assembly and the upper bearing assembly of the passenger-side dual bearing strut assembly each have an upper spring seat and the upper end of the coil spring of the driver-side dual bearing strut assembly and the upper end of the coil spring of the passenger-side dual bearing strut assembly are seated to the upper spring seat of the driver-side dual bearing strut assembly and the upper spring seat of the passenger-side dual bearing strut assembly, respectively. Also, the lower bearing assembly of the driver-side dual bearing strut assembly and the lower bearing assembly of the passenger-side dual bearing strut assembly each have a lower spring seat and the lower end of the coil spring of the driver-side dual bearing strut assembly and the lower end of the coil spring of the passenger-side dual bearing strut assembly are seated to the lower spring seat of the driver side dual bearing strut assembly and the lower spring seat of the passenger-side dual bearing strut assembly, respectively. The upper bearing assembly of the driver-side dual bearing strut assembly and the upper bearing assembly of the passenger-side dual bearing strut assembly may each include a pair of bearing rings with a plurality of ball bearings disposed between the pair of bearing rings. In the alternative or in addition to, the lower bearing assembly of the driver-side dual bearing strut assembly and the lower bearing assembly of the passenger-side dual bearing strut assembly may each include a pair of bearing rings with a plurality of ball bearings disposed between the pair of bearing rings.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments shown and described herein are directed to dual bearing strut assemblies for vehicle suspension systems. The dual bearing strut assemblies include a shock absorber with a damper cylinder, a piston rod and a coil spring disposed around the shock absorber. The dual bearing strut assemblies further include two (dual) bearing assemblies, e.g., an upper bearing assembly which may be affixed to a shock tower of a vehicle and a lower bearing assembly affixed to the damper cylinder. In embodiments, the shock tower is affixed to a top strut mount. The coil spring extends between and is seated to the upper bearing assembly and the lower bearing assembly. Particularly, an upper end of the coil spring may be seated to the upper bearing assembly and a lower end of the coil spring may be seated to the lower bearing assembly. In embodiments, the upper bearing assembly has a first side that is fixed relative to the shock tower and a second side that rotates freely relative to the first side and the shock tower. As used herein, the terms "rotates freely", "freely rotates" and free rotation" refer to rotation of one component relative to another component with a sliding (kinetic) coefficient of friction between the components of less than about 0.005. The upper end of the coil spring may be seated to the second side of the upper bearing assembly. In embodiments, the lower bearing assembly has a first side that is fixed relative to the damper cylinder and a second side that rotates freely relative to the first side and the damper cylinder. The lower end of the coil spring may be seated to the second side of the lower bearing assembly. When the upper end of the coil spring is seated to the second side of the upper bearing assembly and the lower end of the coil spring is seated to the second side of the lower bearing assembly, the coil spring is free to rotate relative to the shock absorber. Also, torque on the damper cylinder resulting from compression of the coil spring is reduced. Various embodiments of dual bearing strut assemblies and vehicle suspension systems with dual bearing strut assemblies will be described in further detail herein with specific reference to the appended drawings.

Figure 3:
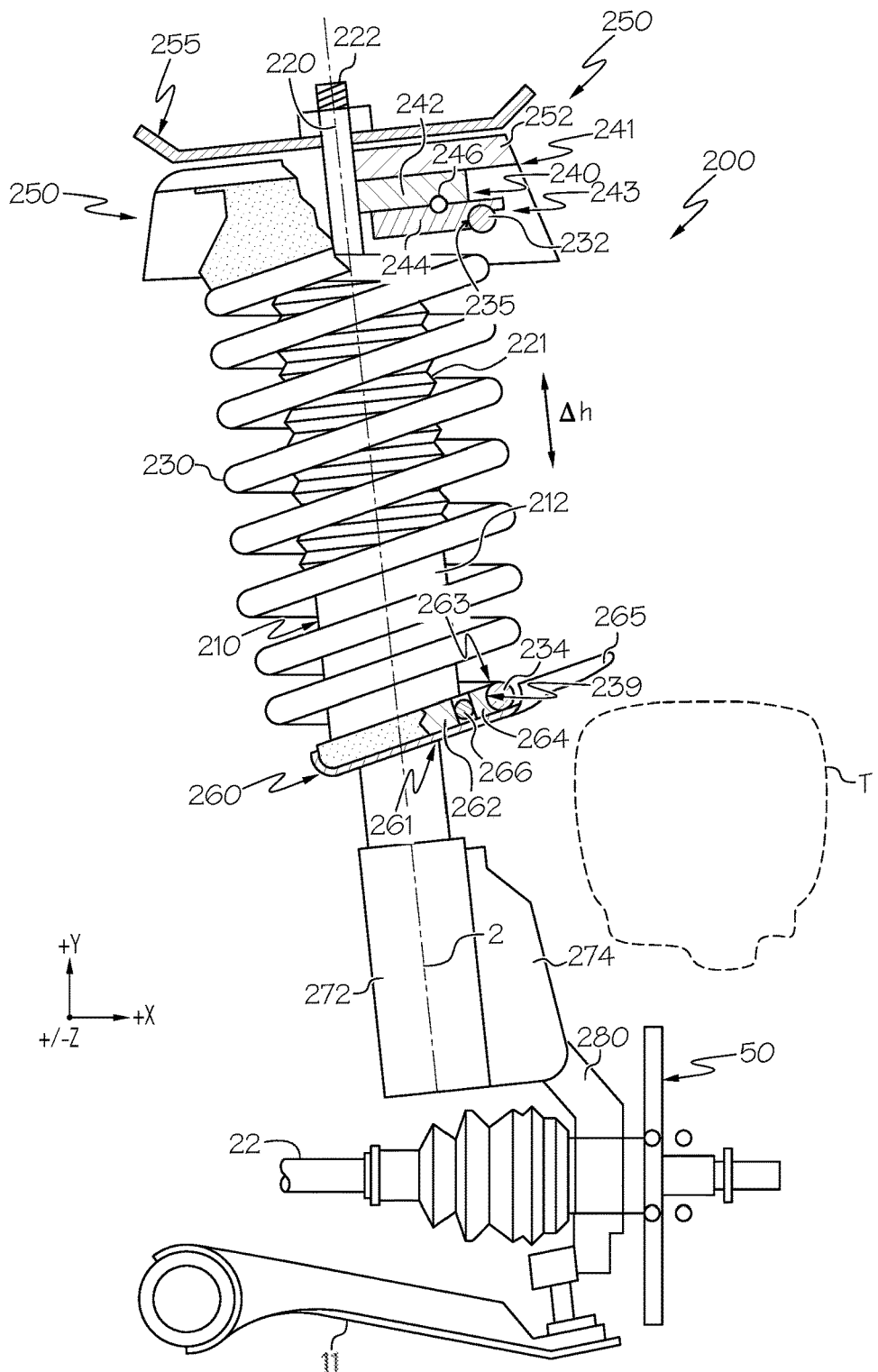
FIG. 3 schematically depicts a front view of a dual bearing strut assembly according to one or more embodiments described and illustrated herein.

FIG. 3 generally depicts a dual bearing strut assembly for a vehicle suspension system. The dual bearing strut assembly may include a shock absorber and a coil spring disposed around the shock absorber. The shock absorber includes a damper cylinder with a lower mount and flange attached to a knuckle of a wheel assembly and a piston rod extending through a shock tower to a top strut mount. The coil spring extends between and is seated to an upper bearing assembly and a lower bearing assembly. The upper bearing assembly has a first side affixed to the shock tower and a second side that rotates freely relative to the first side and the shock tower. The shock tower and the piston rod are affixed to the top strut mount. An upper end of the coil spring is seated to the second side of the upper bearing assembly and is thereby free to rotate relative to the piston rod, shock tower and top strut mount. The lower bearing assembly has a first side affixed to the damper cylinder and a second side that rotates freely relative to the first side and the damper cylinder. The lower end of the coil spring is seated to the second side of the lower bearing assembly and is thereby free to rotate relative to the damper cylinder and knuckle of the wheel assembly, i.e., the lower end of the coil spring is free to rotate about the damper cylinder. The coil spring, which is seated to the second side of the upper bearing assembly and the second side of the lower bearing assembly, is free to rotate relative to the shock absorber. It is understood that compression of the coil spring may result in a rotational movement of the upper end and/or lower end of the coil spring about the shock absorber, i.e., as the coil spring is compressed, the upper end and/or lower end of the coil spring attempt to move rotationally about a longitudinal axis of the shock absorber. Such rotation or attempted rotation of the coil spring is may be referred to as "indexing" or "ratcheting." It is also understood that when the bottom end of the coil spring is affixed to the damper cylinder and not allowed to rotate when the coil spring is compressed, the coil spring applies a torque on the damper cylinder. The torque applied to the damper cylinder may be transferred to the attached knuckle of the wheel assembly and result in a "pull" on the wheel assembly. This pull on the wheel assembly, which may be transferred to a steering mechanism connected to the wheel assembly, may be referred to as "bump steer." Accordingly, effectively isolating rotation of the coil spring relative to the shock absorber using the upper bearing assembly and the lower bearing assembly reduces or eliminates torque on the damper cylinder resulting from compression of the coil spring.

Figure 1:
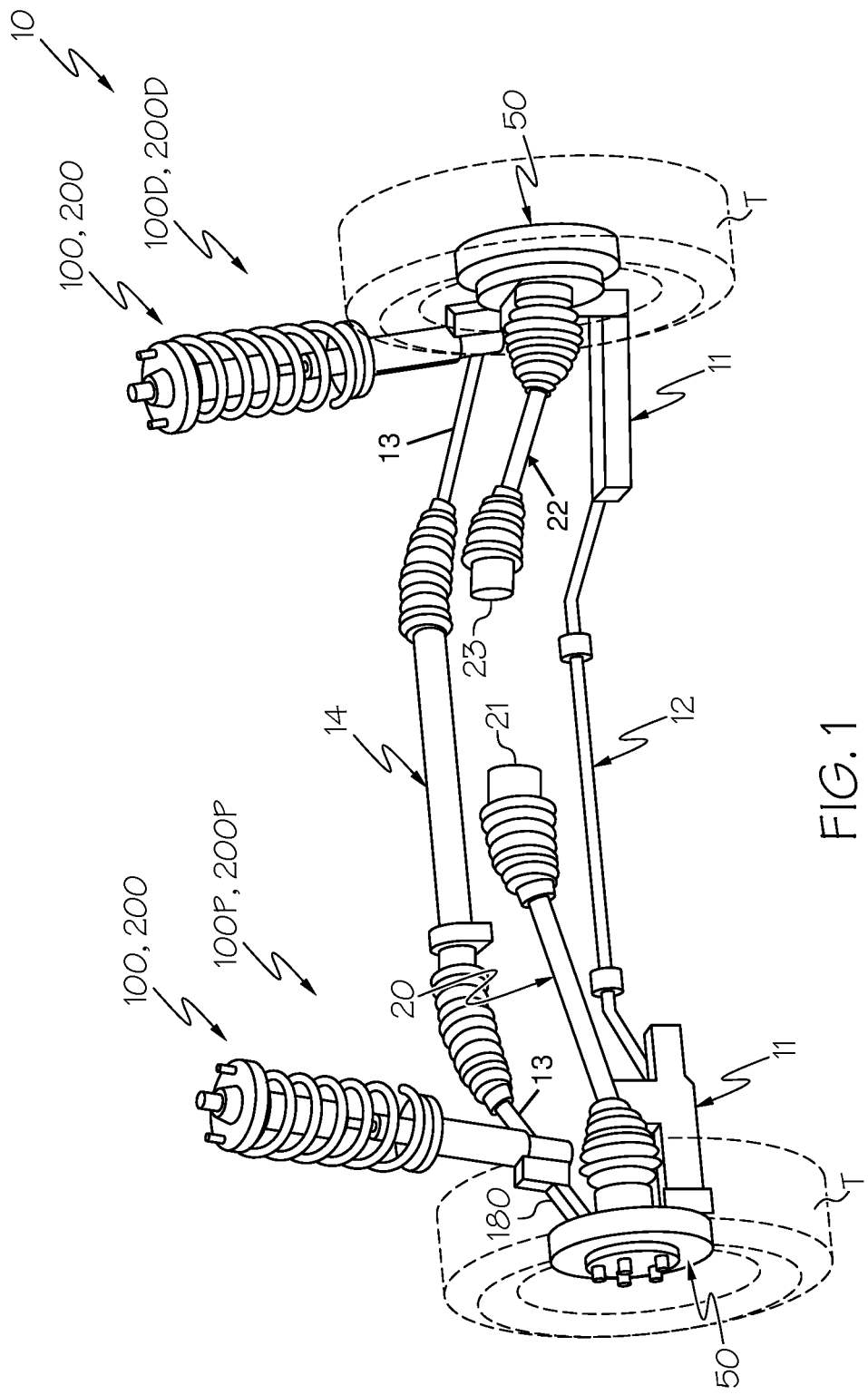
FIG. 1 schematically depicts a perspective view of a vehicle suspension system representing both a single bearing strut assembly embodiment and a dual bearing strut assembly embodiment according to one or more embodiments described and illustrated herein.

Referring now to FIG. 1, a front suspension system 10 for a vehicle includes a strut assembly 100. The front suspension system 10 includes a pair of strut assemblies 100, e.g., a driver-side dual bearing strut assembly 100D and a passenger-side dual bearing strut assembly 100P. The front suspension system 10 may include a pair of knuckles 180 affixed to a pair of wheel assemblies 50 as depicted in FIG. 1. A tire 'T' may be included and be attached to each wheel assembly 50. Each of the strut assemblies 100 may be affixed to one of the knuckles 180 and a top strut mount (not shown), i.e., each of the strut assemblies 100 is affixed to and extends between a top strut mount and a knuckle 180 of a wheel assembly 50. Extending inwardly from each wheel assembly 50 may be a control arm 11. A sway bar 12 may extend between the control arms 11 and thereby assist in reducing roll of the vehicle during corning and traveling over road irregularities. If the vehicle includes a front wheel drive drivetrain, a first constant velocity (CV) shaft 20 and a second CV shaft 22 may be attached to the wheel assemblies 50 as depicted in FIG. 1. The first CV shaft 20 has a first CV joint 21 for attachment to a transmission (not shown) and the second CV shaft 22 has a second CV joint 23 for attachment to the transmission. A pair of steering arms 13 with a track rod 14 extending there between may be attached to the knuckles 180 and translate steering movements from a steering wheel (not shown) to the wheel assemblies 50 and thereby provide steering of the wheel assemblies 50.

Figure 2:
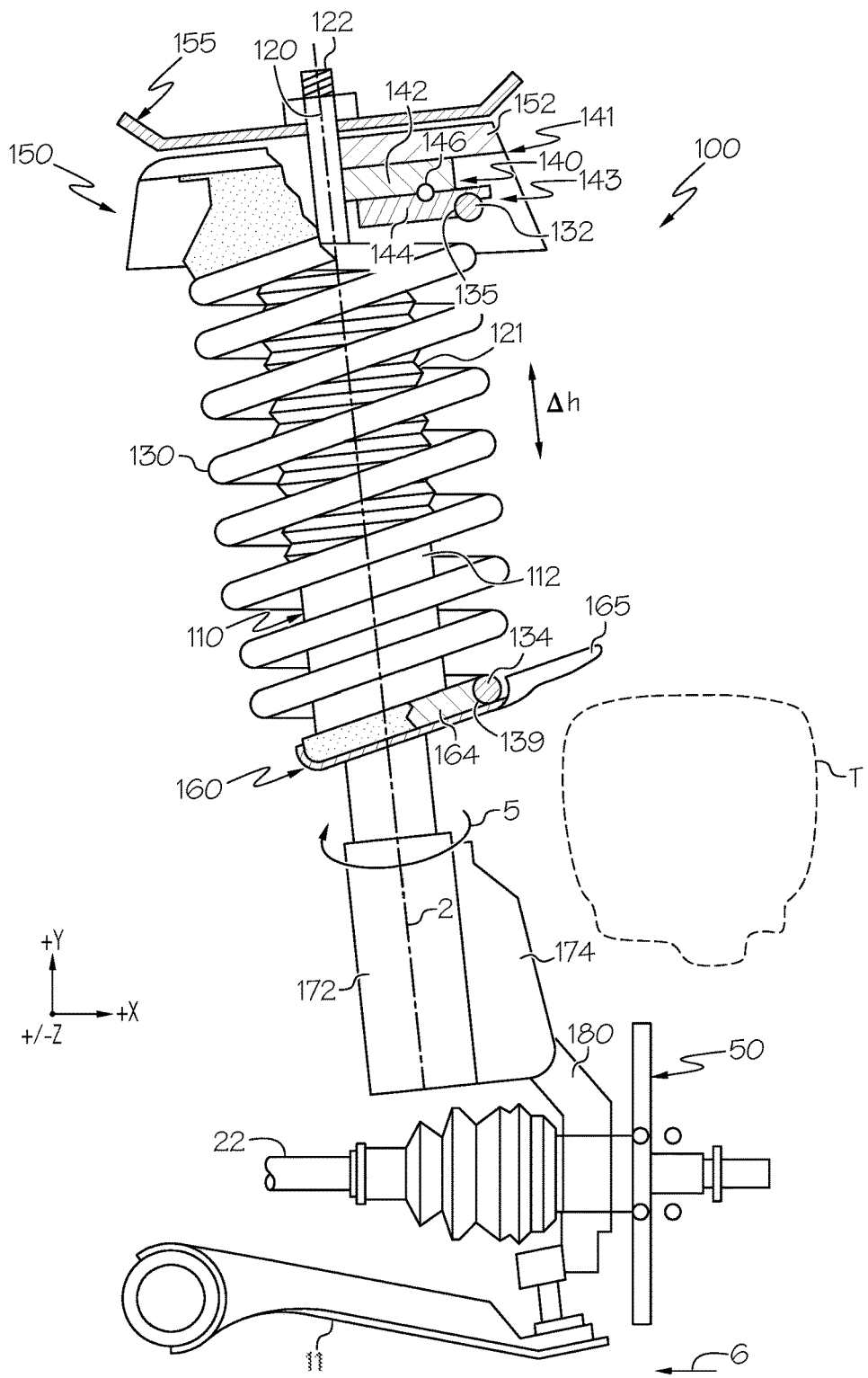
FIG. 2 schematically depicts a front view of a single bearing strut assembly.

Referring to FIG. 2, the strut assembly 100 of FIG. 1 is depicted in greater detail. The strut assembly 100 is a single bearing strut assembly and includes include a shock absorber 110 with a damper cylinder 112 and a piston rod 120. A coil spring 130 is disposed around the shock absorber 110 and a dust boot 121 may be included and extend from the damper cylinder 112 towards an upper end 122 of the piston rod 120. The upper end 122 of the piston rod 120 may extend through a shock tower 150 and be affixed to a top strut mount 155. In embodiments, the shock tower 150 may affixed to the top strut mount 155. The damper cylinder 112 may be affixed to a lower mount 172. The lower mount 172 may include a flange 174 that is affixed to the knuckle 180 of the wheel assembly 50. The tire T may be attached to the wheel assembly 50.

An upper bearing assembly 140 may be included and have a first side 141 affixed to the shock tower 150 and a second side 143 that freely rotates relative to the first side 141 and the shock tower 150. In embodiments, an isolator 152 that reduces transfer of high frequency vibrations from the upper bearing assembly 140 to the shock tower 150 may be positioned between the first side 141 and the shock tower 150. The first side 141 may include a first bearing ring 142 and the second side 143 may include a second bearing ring 144. A plurality of bearings 146, e.g., ball bearings, may be disposed between the first bearing ring 142 and the second bearing ring 144 such that the second side 143 of the upper bearing assembly 140 rotates freely relative to the first side 141. A lower seat 160 comprising a flange 162 and an isolator 164 affixed to the damper cylinder 112 may be included.

The coil spring 130 includes an upper end 132 that may be seated to the upper bearing assembly 140. Particularly, the upper end 132 of the coil spring 130 may be seated to the second side 143 of the upper bearing assembly 140. In embodiments, the upper end 132 is seated to a complimentary seat surface 135 of the second bearing ring 144. While the seat surface 135 of the second bearing ring 144 is depicted as being part of the second bearing ring 144, i.e.,the second bearing ring 144 is depicted as being formed to include the seat surface 135 such that the upper end 132 is positioned in direct contact with the second bearing ring 144, it is understood that the seat surface 135 may be part of a separate spring seat or isolator that is attached to the second bearing ring 144 as discussed in greater detail below. The coil spring 130 also includes a lower end 134 that may be seated to the lower seat 160. Particularly, the lower end 134 may be seated to the isolator 164. In embodiments, the isolator 164 includes a seat surface 139 to which the lower end 134 of the coil spring 130 is seated. It is understood that the coil spring 130 extends from the upper bearing assembly 140 to the lower seat 160. It is also understood that the isolator 164 does not rotate freely relative to the damper cylinder 112. Accordingly, when the strut assembly 100 is compressed (−Y direction), e.g., when the tire T hits a "bump" on a road, the lower end 134 of the coil spring 130 attempts to rotate about a longitudinal axis 2 of the shock absorber 110. However, the lower end 134 of the coil spring 130 is fixed in position relative to rotation about the longitudinal axis 2 of the shock absorber. Accordingly, compression of the coil spring 130 applies a torque 5 to the damper cylinder 112 about the longitudinal axis 2. Also, the torque 5 may be transferred to the wheel assembly 50 and result in the wheel assembly 50 moving or being pulled as depicted by arrow 6 in FIG. 1. The pull 6 on the wheel assembly 50 may be experienced as a pull on a steering wheel of a vehicle, i.e., a driver of the vehicle will feel a pull on the steering wheel (bump steer).

Referring now to FIG. 3, a dual bearing strut assembly 200 also represented by FIG. 1, according to one or more embodiments is depicted. The dual bearing strut assembly 200 may include a shock absorber 210 with a damper cylinder 212 and a piston rod 220. A coil spring 230 is disposed around the shock absorber 210 and a dust boot 221 may be included and extend from the damper cylinder 212 towards an upper end 222 of the piston rod 220. The upper end 222 of the piston rod 220 may extend through a shock tower 250 and be affixed to a top strut mount 255. In embodiments, the shock tower 250 may be affixed to the top strut mount 255. The damper cylinder 212 may be affixed to a lower mount 272. The lower mount 272 may include a flange 274 that is affixed to the knuckle 180 of the wheel assembly 50. The tire T may be attached to the wheel assembly 50.

An upper bearing assembly 240 may be included and have a first side 241 affixed to the shock tower 250 and a second side 243 that freely rotates relative to the first side 241 and the shock tower 250. In embodiments, an isolator 252 may be positioned between the first side 241 and the shock tower 250. The isolator 252 may be formed from an elastomeric material (including rubber) that absorbs, and thereby reduces transfer of, high frequency vibrations from the upper bearing assembly 240 to the shock tower 250. The first side 241 may include a first bearing ring 242 and the second side 243 may include a second bearing ring 244. A plurality of bearings 246, e.g., ball bearings, may be disposed between the first bearing ring 242 and the second bearing ring 244 such that the second side 243 of the upper bearing assembly 240 rotates freely relative to the first side 241. In the illustrated embodiment, the upper bearing assembly 240 may be a thrust-type upper bearing assembly 240 that is configured to rotate under axial loads that may be provided by the coil spring 230 during operation.

A lower bearing assembly 260 may be included and have a first side 261 affixed to the damper cylinder 212 and a second side 263 that freely rotates relative to the first side 261 and the damper cylinder 212. The first side 261 may include a first bearing ring 262 and the second side 263 may include a second bearing ring 264. A plurality of bearings 266, e.g., ball bearings, may be disposed between the first bearing ring 262 and the second bearing ring 264 such that the second side 263 of the lower bearing assembly 260 rotates freely relative to the first side 261. In the illustrated embodiment, the lower bearing assembly 260 may also be a thrust-type lower bearing assembly 260 that is configured to rotate under axial loads that may be provided by the coil spring 230 during operation.

The coil spring 230 includes an upper end 232 that may be seated to the upper bearing assembly 240. Particularly, the upper end 232 of the coil spring 230 may be seated to the second side 243 of the upper bearing assembly 240. In embodiments, the upper end 232 is seated to a complimentary seat surface 235 of the second bearing ring 244. While the seat surface 235 of the second bearing ring 244 is depicted as being part of the second bearing ring 244, i.e., the second bearing ring 244 is depicted as being formed to include the seat surface 235 such that the upper end 232 is positioned in direct contact with the second bearing ring 244, it is understood that the seat surface 235 may be part of a separate spring seat or isolator (not shown) that is attached to the second bearing ring 244 as discussed in greater detail below.

The coil spring 230 also includes a lower end 234 that may be seated to the lower bearing assembly 260. Particularly, the lower end 234 may be seated to the second side 263 of the lower bearing assembly 260. In embodiments, the lower end 234 is seated to a complimentary seat surface 239 of the second bearing ring 264. While the seat surface 239 of the second bearing ring 264 is depicted as being part of the second bearing ring 264, i.e., the second bearing ring 264 is depicted as being formed to include the seat surface 239 such that the lower end 234 is positioned in direct contact with the second bearing ring 264, it is understood that the seat surface 239 may be part of a separate spring seat or isolator that is attached to the second bearing ring 264 as discussed in greater detail below.

The coil spring 230 extends from the upper bearing assembly 240 to the lower bearing assembly 260. When the dual bearing strut assembly 200 is compressed (e.g., by Δh in the −Y direction), the lower end 234 of the coil spring 230 is free to rotate about a longitudinal axis 2 of the shock absorber 210. That is, the lower end 234 of the coil spring 230 is free to rotate about the damper cylinder 212. Accordingly, torque on the damper cylinder 212 resulting from compression of the coil spring 230 is reduced due to the free movement of the lower end 234 of the coil spring 230 and transfer of torque from the damper cylinder 212 to the knuckle 180 of the wheel assembly 50 is also reduced.

While FIG. 3 depicts the dual bearing strut assembly 200 having the upper bearing assembly 240 and the lower bearing assembly 260 with seat surfaces 235 and 239, respectively, formed within the second bearing rings 244 and 264, respectively, other arrangements and configurations of bearing assemblies may be included as described below.

Figure 4:
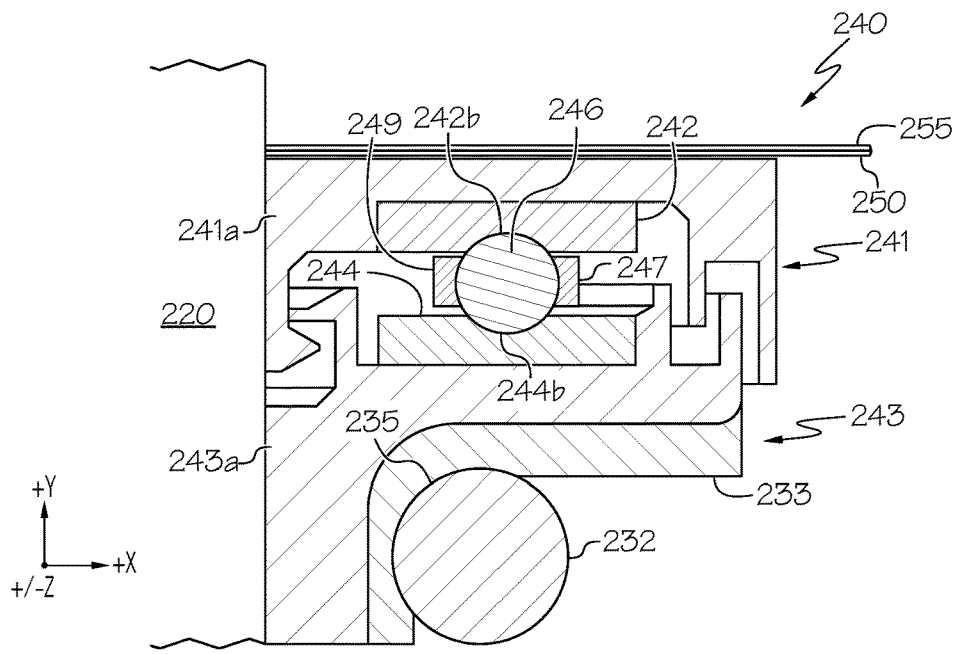
FIG. 4 schematically depicts an upper bearing assembly for use in the dual bearing strut assembly of FIG. 3 according to one or more embodiments described and illustrated herein.

Referring now to FIG. 4, embodiments of the upper bearing assembly 240 are shown. Particularly, the upper bearing assembly 240 includes the first side 241 and the second side 243. The first side 241 is affixed to the shock tower 250 which may be affixed to the top strut mount 255. The second side 243 is oppositely disposed (−Y direction) from the first side 241 and is free to rotate about the Y-axis depicted in FIG. 4 relative to the first side 241, the shock tower 250 and the top strut mount 255. In embodiments, the plurality of bearings 246 are disposed between the first side 241 and second side 243. Particularly, the first side 241 may include a first bearing member 241a with the first bearing ring 242 and the second side 243 may include a second bearing member 243a with the second bearing ring 244. The first bearing ring 242 and second bearing ring 244 may include bearing surfaces 242b and 244b, respectively, that engage the plurality of bearings 246 as the plurality of bearings 246 roll due to the second side 243 rotating relative to the first side 241. In embodiments, a first side member 247 positioned radially outward (+X direction) from the plurality of bearings 246 and a second side member 249 positioned radially inward (−X direction) from the plurality of bearings 246 may be included and assist in alignment of the plurality of bearings 246 with the bearing surfaces 242b, 244b of the first bearing ring 242 and second bearing ring 244, respectively. In embodiments, an isolator 233 with a seat surface 235 may be included and attached to the second bearing member 243a as depicted in FIG. 4. The isolator 233 may be formed from an elastomeric material (including rubber) that absorbs, and thereby reduces transfer of, high frequency vibrations from the coil spring 230 to the upper bearing assembly 240. The seat surface 235 may be complimentary in shape with an outer surface of the upper end 232 of the coil spring 230 such that a friction or interference fit is provided between the isolator 233 and upper end 232 of the coil spring 230.

Figure 5:
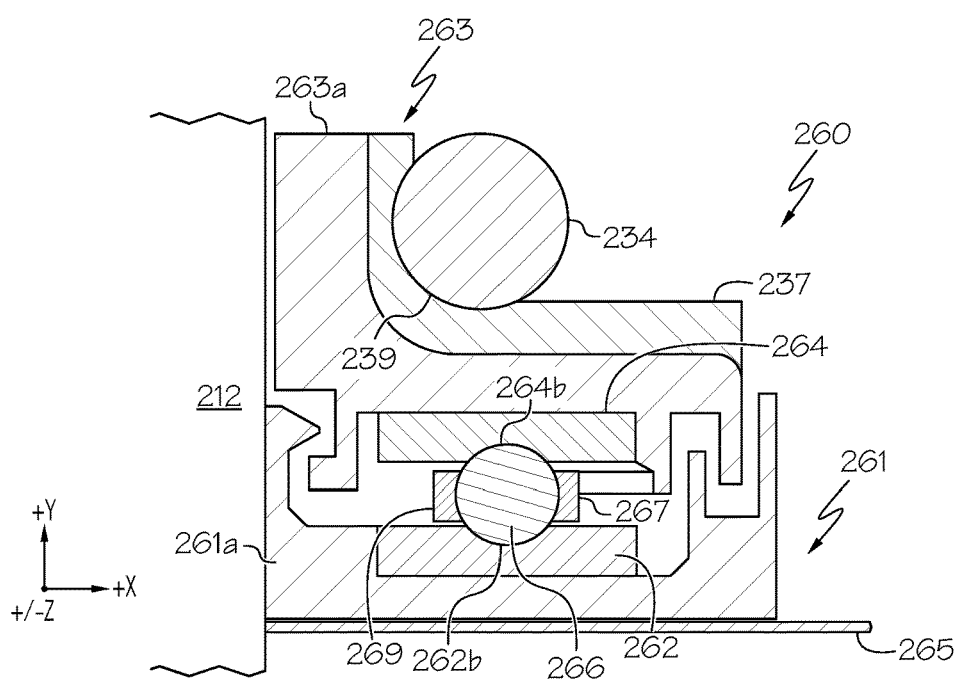
FIG. 5 schematically depicts a lower bearing assembly for use in the dual bearing strut assembly of FIG. 3 according to one or more embodiments described and illustrated herein.

Referring now to FIG. 5, embodiments of the lower bearing assembly 260 are shown. Particularly, the lower bearing assembly 260 includes the first side 261 and the second side 263. The first side 261 is affixed to the damper cylinder 212 which has the lower mount 272 and flange 274 for rigid attachment of the damper cylinder 212 to the knuckle 180 (FIG. 3). The second side 263 is oppositely disposed (+Y direction) from the first side 261 and is free to rotate relative to the first side 261, the damper cylinder 212 and the knuckle 180. In embodiments, the plurality of bearings 266 are disposed between the first side 261 and second side 263. Particularly, the first side 261 may include a first bearing member 261a with the first bearing ring 262 and the second side 263 may include a second bearing member 263a with the second bearing ring 264. The first bearing ring 262 and second bearing ring 264 may include bearing surfaces 262b and 264b, respectively that engage the plurality of bearings 266 as the plurality of bearings 266 roll due to the second side 263 rotating about the Y-axis depicted in FIG. 5 relative to the first side 261. In embodiments, a first side member 267 positioned radially outward (+X direction) from the plurality of bearings 266 and a second side member 269 positioned radially inward (−X direction) from the plurality of bearings 266 may be included and assist in alignment of the plurality of bearings 266 with the bearing surfaces 262b, 264b of the first bearing ring 262 and second bearing ring 264, respectively. In embodiments, an isolator 237 with a seat surface 239 may be included and attached to the second bearing member 263a as depicted in FIG. 5. The isolator 237 may be formed from an elastomeric material (including rubber) that absorbs, and thereby reduces transfer of, high frequency vibrations from the coil spring 230 to the lower bearing assembly 260. In embodiments, the seat surface 239 is complimentary in shape with an outer surface of the lower end 234 of the coil spring 230 such that a friction or interference fit is provided between the isolator 237 and lower end 234 of the coil spring 230.

Referring now to FIGS. 1 and 3-5, a vehicle front suspension system 10 includes a pair of dual bearing strut assemblies 200. Particularly, the vehicle front suspension system 10 includes a driver-side dual bearing strut assembly 200D and a passenger-side dual bearing strut assembly 200P. Each of the dual bearing strut assemblies 200 may include the shock absorber 210 with the damper cylinder 212 and the piston rod 220. The coil spring 230 is disposed around the shock absorber 210 and the dust boot 221 may be included and extend from the damper cylinder 212 towards the upper end 222 of the piston rod 220. The upper end 222 of the piston rod 220 may extend through the shock tower 250 and be affixed to the top strut mount 255. In embodiments, the shock tower 250 may be affixed to the top strut mount 255. The damper cylinder 212 may be affixed to the lower mount 272. The lower mount 272 may include the flange 274 that is affixed to the knuckle 180 of the wheel assembly 50. The tire T may be attached to the wheel assembly 50.

Each of the dual bearing strut assemblies 200 may include the upper bearing assembly 240 comprising the first side 241 and the second side 243. The first side 241 is affixed to the shock tower 250 which may be affixed to the top strut mount 255. The second side 243 is oppositely disposed (−Y direction) from the first side 241 and is free to rotate about the Y-axis depicted in FIG. 4 relative to the first side 241, the shock tower 250 and the top strut mount 255. In embodiments, the plurality of bearings 246 are disposed between the first side 241 and second side 243. Particularly, the first side 241 may include the first bearing member 241a with the first bearing ring 242 and the second side 243 may include the second bearing member 243a with the second bearing ring 244. The first bearing ring 242 and second bearing ring 244 may include the bearing surfaces 242b and 244b, respectively, that engage the plurality of bearings 246 as the plurality of bearings 246 roll due to the second side 243 rotating relative to the first side 241. In embodiments, the first side member 247 positioned radially outward (+X direction) from the plurality of bearings 246 and the second side member 249 positioned radially inward (−X direction) from the plurality of bearings 246 may be included and assist in alignment of the plurality of bearings 246 with the bearing surfaces 242b, 244b of the first bearing ring 242 and second bearing ring 244, respectively. In embodiments, the isolator 233 with the seat surface 235 may be included and attached to the second bearing member 243a as depicted in FIG. 4. The seat surface 235 may be complimentary in shape with the outer surface of the upper end 232 of the coil spring 230 such that a friction or interference fit is provided between the isolator 233 and upper end 232 of the coil spring 230.

Still referring to FIGS. 1 and 3-5, each of the dual strut bearing assemblies may also include the lower bearing assembly 260 comprising the first side 261 and the second side 263. The first side 261 is affixed to the damper cylinder 212 which has the lower mount 272 and flange 274 for rigid attachment of the damper cylinder 212 to the knuckle 180. The second side 263 is oppositely disposed (+Y direction) from the first side 261 and is free to rotate relative to the first side 261, the damper cylinder 212 and the knuckle 180. In embodiments, the plurality of bearings 266 are disposed between the first side 261 and second side 263. Particularly, the first side 261 may include the first bearing member 261a with the first bearing ring 262 and the second side 263 may include the second bearing member 263a with the second bearing ring 264. The first bearing ring 262 and second bearing ring 264 may include bearing surfaces 262b and 264b, respectively, that engage the plurality of bearings 266 as the plurality of bearings 266 roll due to the second side 263 rotating about the Y-axis depicted in FIG. 5 relative to the first side 261. In embodiments, the first side member 267 positioned radially outward (+X direction) from the plurality of bearings 266 and the second side member 269 positioned radially inward (−X direction) from the plurality of bearings 266 may be included and assist in alignment of the plurality of bearings 266 with the bearing surfaces 262b, 264b of the first bearing ring 262 and second bearing ring 264, respectively. In embodiments, the isolator 237 with the seat surface 239 may be included and attached to the second bearing member 263a as depicted in FIG. 5. In embodiments, the seat surface 239 is complimentary in shape with the outer surface of the lower end 234 of the coil spring 230 such that a friction or interference fit is provided between the isolator 237 and lower end 234 of the coil spring 230.

In combination, the upper bearing assembly 240 and the lower bearing assembly 260 isolate rotational movement of the coil spring 230 from the knuckle 180 and wheel assembly 50. In particular, the second side 263 of the lower bearing assembly 260 freely rotates relative to the first side 261, the damper cylinder 212 and the knuckle 180, and allows the lower end 234 of the coil spring 230 to freely rotate about the damper cylinder 212 when the coil spring 230 is compressed. Free rotation of the lower end 234 of the coil spring 230 about the damper cylinder 212 reduces or prevents torque on the damper cylinder 212 during compression of the coil spring 230 and thereby reduces or prevents the transfer of torque from the coil spring 230 to the knuckle 180 and wheel assembly 50. Accordingly, bump steer resulting from the tires T impacting or rolling over irregularities on a road surface is reduced or eliminated.

Example

Figure 6:
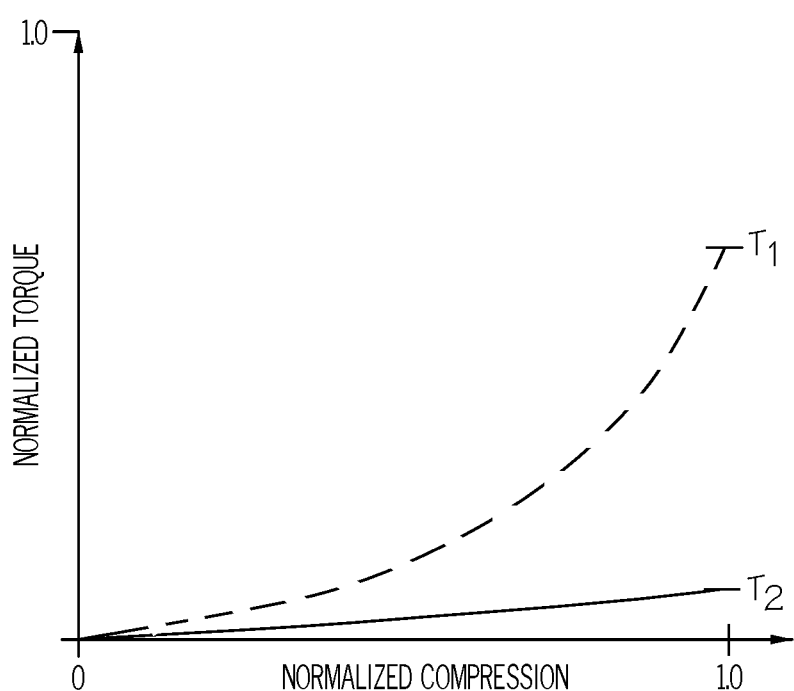
FIG. 6 graphically depicts normalized torque versus normalized compression for a single bearing strut assembly (dotted line) and a dual bearing strut assembly (solid line) according to one or more embodiments described and illustrated herein.

Referring to FIGS. 2, 3 and 6, an illustrative graphical example of torque resulting from the strut assembly 100 and the dual bearing strut assembly 200 is graphically depicted in FIG. 6. Particularly, normalized torque for the strut assembly 100 (dotted line) and dual bearing strut assembly 200 (solid line) for a given normalized compression of 1.0 is depicted. Normalized compression of the strut assembly 100 by the amount 1.0 results in a normalized torque $T_1$ about the longitudinal axis 2 of the shock absorber 110 and compression of the dual bearing strut assembly 200 by the amount 1.0 results in a normalized torque $T_2$ about the longitudinal axis 2 of the shock absorber 210. The normalized torque $T_2$ is less than the normalized torque $T_1$. In some embodiments, $T_2$ is less than or equal to 50% of $T_1$ ($T_2 \leq 0.5T_1$), for example $T_2$ is less than or equal to 60% of $T_1$ ($T_2 \leq 0.6T_1$), or even less than or equal to 70% of $T_1$ ($T_2 \leq 0.7T_1$). In embodiments where $T_2$ is less than or equal to 70% of $T_1$, $T_2$ is less than or equal to 80% of $T_1$ ($T_2 \leq 0.8T_1$), or even less than or equal to 90% of $T_1$ ($T_2 \leq 0.9T_1$).

The dual bearing strut assembly isolates rotation of the strut coil spring from the strut damper cylinder by allowing the coil spring to freely rotate relative to the damper cylinder when the coil spring is compressed. Free rotation of the coil spring relative to the damper cylinder results in a reduced torque (or zero torque) being transferred to the wheel assembly of the vehicle and a driver of the vehicle feeling a reduced pull (or no pull) of the steering wheel when the vehicle travels over road irregularities.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dual bearing strut assembly for a vehicle suspension system comprising:
   a strut comprising a damper cylinder, a piston rod and a coil spring, the coil spring having an upper end and a lower end;
   an upper bearing assembly;
   a lower bearing assembly;
   wherein;
   the coil spring extends between the upper bearing assembly and the lower bearing assembly;
   the upper end of the coil spring is seated to the upper bearing assembly;
   the lower end of the coil spring is seated to the lower bearing assembly such that the lower end of the coil spring rotates freely about the damper cylinder when the coil spring is compressed.

2. The dual bearing strut assembly of claim 1, wherein the upper bearing assembly has an upper spring seat and the upper end of the coil spring is seated to the upper spring seat.

3. The dual bearing strut assembly of claim 1, wherein the lower bearing assembly has a lower spring seat and the lower end of the coil spring is seated to the lower spring seat.

4. The dual bearing strut assembly of claim 1, wherein:
   the upper bearing assembly has an upper spring seat and the upper end of the coil spring is seated to the upper spring seat;
   the lower bearing assembly has a lower spring seat and the lower end of the coil spring is seated to the lower spring seat.

5. The dual bearing strut assembly of claim 1, wherein the upper bearing assembly comprises a pair of bearing rings with a plurality of bearings disposed between the pair of bearing rings.

6. The dual bearing strut assembly of claim 1, wherein the lower bearing assembly comprises a pair of bearing rings with a plurality of bearings disposed between the pair of bearing rings.

7. The dual bearing strut assembly of claim 1, wherein the upper bearing assembly and the lower bearing assembly each comprise a pair of bearing rings with a plurality of bearings disposed between the pair of bearing rings.

8. A vehicle suspension system comprising:
   a top strut mount, a shock tower and a knuckle of a wheel assembly;
   a dual bearing strut assembly affixed to and extending between the top strut mount and the knuckle, the dual bearing strut assembly comprising:
   a damper cylinder, a piston rod and a coil spring, the coil spring having an upper end and a lower end;
   an upper bearing assembly affixed to the shock tower;
   a lower bearing assembly affixed to the damper cylinder of the dual bearing strut assembly;
   wherein:
   the upper end of the coil spring is seated to the upper bearing assembly;
   the lower end of the coil spring is seated to the lower bearing assembly such that the lower end of the coil spring freely rotates about the damper cylinder when the coil spring is compressed.

9. The vehicle suspension system of claim 8, wherein the piston rod has an upper end affixed to the top strut mount and the damper cylinder has a lower mount affixed to the knuckle.

10. The vehicle suspension system of claim 8, wherein the upper bearing assembly has an upper spring seat and the upper end of the coil spring is seated to the upper spring seat.

11. The vehicle suspension system of claim 8, wherein the lower bearing assembly has a lower spring seat and the lower end of the coil spring is seated to the lower spring seat.

12. The vehicle suspension system of claim 8, wherein:
   the upper bearing assembly has an upper spring seat and the upper end of the coil spring is seated to the upper spring seat;
   the lower bearing assembly has a lower spring seat and the lower end of the coil spring is seated to the lower spring seat.

13. The vehicle suspension system of claim 8, wherein the upper bearing assembly comprises a pair of bearing rings with a plurality of bearings disposed between the pair of bearing rings.

14. The vehicle suspension system of claim 8, wherein the lower bearing assembly comprises a pair of bearing rings with a plurality of bearings disposed between the pair of bearing rings.

15. The vehicle suspension system of claim 8, wherein the upper bearing assembly and the lower bearing assembly each comprise a pair of bearing rings with a plurality of bearings disposed between the pair of bearing rings.

16. A front suspension system for a vehicle comprising:
   a driver-side top strut mount and a passenger-side top strut mount, a driver-side knuckle and a passenger-side knuckle, a driver-side dual bearing strut assembly affixed to and extending between the driver-side top strut mount and the driver-side knuckle, a passenger-side dual bearing strut assembly affixed to and extending between the passenger-side top strut mount and the passenger-side knuckle;
   the driver-side dual bearing strut assembly and the passenger-side dual bearing strut assembly each comprising:
   a damper cylinder, a piston rod and a coil spring;
   an upper bearing assembly;
   a lower bearing assembly;
   an upper end of the coil spring seated to the upper bearing assembly;
   a lower end of the coil spring seated to the lower bearing assembly;
   wherein the lower end of the coil spring of the driver-side dual bearing strut assembly and passenger-side dual bearing strut assembly freely rotates about the damper cylinder of the driver-side dual bearing strut assembly and passenger-side dual bearing strut assembly, respectively, when the coil spring of the driver-side dual bearing strut assembly and passenger-side dual bearing strut assembly, respectively, is compressed.

17. The front suspension system of claim 16, wherein:
   the upper bearing assembly of the driver-side dual bearing strut assembly and the upper bearing assembly of the passenger-side dual bearing strut assembly each have an upper spring seat;
   the upper end of the coil spring of the driver-side dual bearing strut assembly and the upper end of the coil spring of the passenger-side dual bearing strut assembly are seated to the upper spring seat of the driver-side dual bearing strut assembly and the upper spring seat of the passenger-side dual bearing strut assembly, respectively;

the lower bearing assembly of the driver-side dual bearing strut assembly and the lower bearing assembly of the passenger-side dual bearing strut assembly each have a lower spring seat;

the lower end of the coil spring of the driver-side dual bearing strut assembly and the lower end of the coil spring of the passenger-side dual bearing strut assembly are seated to the lower spring seat of the driver-side dual bearing strut assembly and the lower spring seat of the passenger-side dual bearing strut assembly, respectively.

18. The front suspension system of claim 16, wherein the upper bearing assembly of the driver-side dual bearing strut assembly and the upper bearing assembly of the passenger-side dual bearing strut assembly each comprise a pair of bearing rings with a plurality of ball bearings disposed between the pair of bearing rings.

19. The front suspension system of claim 16, wherein the lower bearing assembly of the driver-side dual bearing strut assembly and the lower bearing assembly of the passenger-side dual bearing strut assembly each comprise a pair of bearing rings with a plurality of bearings disposed between the pair of bearing rings.

20. The front suspension system of claim 16, wherein:

the upper bearing assembly of the driver-side dual bearing strut assembly and the upper bearing assembly of the passenger-side dual bearing strut assembly each comprise a pair of bearing rings with a plurality of bearings disposed between the pair of bearing rings;

the lower bearing assembly of the driver-side dual bearing strut assembly and the lower bearing assembly of the passenger-side dual bearing strut assembly each comprise a pair of bearing rings with a plurality of bearings disposed between the pair of bearing rings.

* * * * *